United States Patent [19]

Mason, Jr.

[11] 4,165,855

[45] Aug. 28, 1979

[54] COOKING UTENSIL KIT

[76] Inventor: Stanley I. Mason, Jr., 61 River Rd., Weston, Conn. 06880

[21] Appl. No.: 858,093

[22] Filed: Dec. 7, 1977

[51] Int. Cl.² ............................ A23G 1/20; B28B 7/16
[52] U.S. Cl. ..................................... 249/102; D7/43; D7/85; 249/142
[58] Field of Search ................ 249/102, DIG. 1, 117, 249/55, 135, 142; 99/DIG. 15, 428, 422, 426; 425/182; 220/4 B, 4 E, 23.83, 23.86; D7/43, 85, 97

[56] References Cited

U.S. PATENT DOCUMENTS

| 1,727,257 | 9/1929 | Stratton | 249/DIG. 1 |
|---|---|---|---|
| 2,562,602 | 10/1950 | Crumrine | 220/23.83 X |
| 2,960,218 | 11/1960 | Cheeley | 249/142 X |
| 3,250,422 | 5/1966 | Parish | 220/23.83 |
| 3,262,668 | 7/1966 | Luker | 249/142 |
| 3,700,204 | 10/1972 | Swett | 249/142 |

Primary Examiner—Richard B. Lazarus
Assistant Examiner—John S. Brown
Attorney, Agent, or Firm—Haynes N. Johnson; Mark P. Stone

[57] ABSTRACT

A cooking utensil kit includes a large generally circular mixing bowl and a center post. The center post is in the shape of a truncated cone having a height approximately the same as the sides of the bowl and is adapted to serve as a container. A generally hemispherical knob is formed at the center of the base of the mixing bowl and the post has a complementary hemispherical indentation in its base. The post is adapted to be centered in the bowl at the knob so that it may be plunged into batter in the bowl and the bowl may then be used as a pan for preparing ring-shaped foods. The kit also includes a serving dish which also has a knob formed at the center of its base and is adapted to receive and center the post. Either the bowl or dish may serve as the top to the other. A fourth component of the kit is a trivet upon which either the bowl or the dish may be supported or which may be placed in the bowl or dish. The outer rim of the trivet is shaped to complement the inner surface of the bowl and may be elevated within the bowl by rotating it relative to the bowl.

23 Claims, 11 Drawing Figures

COOKING UTENSIL KIT

BACKGROUND OF THE INVENTION

This invention relates to a cooking utensil kit, and more particularly to a kit of only a few parts which may be combined to serve a wide range of cooking functions.

In the usual home kitchen, a wide variety of kitchen utensils must be stored so that each utensil will be available for the special use for which that utensil is designed. Hence, a large amount of space is wasted in storage of a large number of utensils which are seldom used. For example, one such special purpose utensil is a large pan having a center post therein which is generally used for baking angel food cakes and other cakes having a hole therethrough.

This invention provides a bowl and a post adapted to be centered within the bowl to form a pan.

This invention further provides a cooking utensil kit of only four components which can be combined in different manners to provide a wide range of cooking utensils.

SUMMARY OF THE INVENTION

In accordance with principles of this invention various kit parts are provided which can interrelate with one another. These include a large bowl with an internal, centered hemispherical protuberance adapted in size and shape to receive a complementary post member, a conical post member adapted to fit within the bowl base with a complementary indentation in its base for centering the post on the protuberance in the bowl, a serving dish adapted to interfit with the bowl periphery so that each is adapted for use as a cover to the other, and a trivet which can be used separately beneath either the bowl or dish to interfit in centered position within the bowl. The removable center post is adapted to be centered in either of the first components.

BRIEF DESCRIPTION OF THE DRAWINGS

The foregoing and other objects, features, and advantages of the invention will be apparent from the following more particular description of a preferred embodiment of the invention, as illustrated in the accompanying drawings in which like reference characters refer to the same parts throughout the different views. The drawings are not necessarily to scale, emphasis being placed instead upon illustrating the principles of the invention.

DESCRIPTION OF A PREFERRED EMBODIMENT OF THE INVENTION

Figure 1:
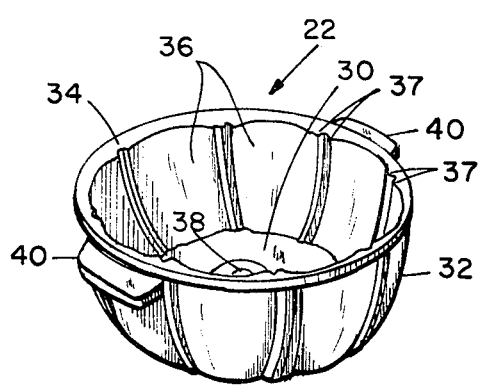
FIG. 1 is a perspective view of a bowl used in the cooking kit of the present invention.
Figure 3:
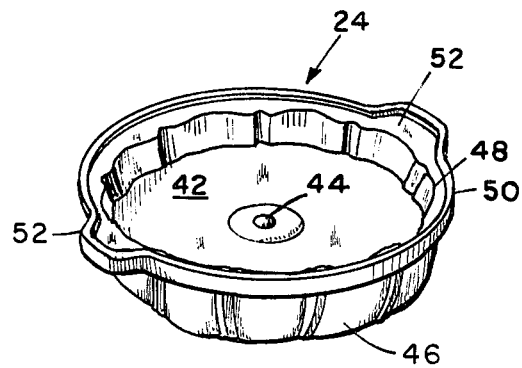
FIG. 3 is a perspective view of a serving dish used in the cooking kit.
Figure 4:
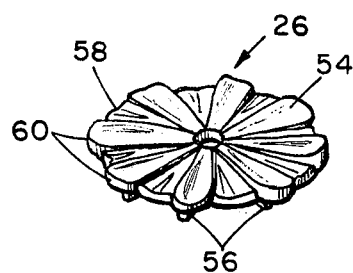
FIG. 4 is a perspective view of a trivet used in the cooking kit.
Figure 2:
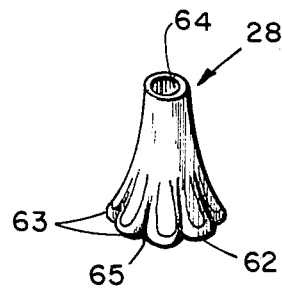
FIG. 2 is a perspective view of a center post in accordance with the present invention.

Each of FIGS. 1–4 shows an individual component of the cooking kit. Specifically, FIG. 1 shows a large mixing bowl 22; FIG. 2 shows a center post 28; FIG. 3 shows a serving dish 24; and FIG. 4 shows a trivet 26. Each component is adapted to interfit with each other component of material suitable for use in a microwave home oven. Preferably, the material is a ceramic which is transparent to the microwaves and sufficiently heat resistant for use in a conventional oven. Heat resistant plastic may also be used.

Referring now to FIG. 1, the large bowl 22 comprises a base 30 and closed sides 32. The sides define a rim 34 opposite to the base 30. For reasons to be noted subsequently, the inner surface of sides 32 is irregular, having concave portions 36 around the entire inner surface. The concave portions are bordered by pairs of inwardly protruding ridges 37. Each two ridges 37 define a narrow groove therebetween. Further, for purposes to be discussed, a small central protuberance 38 in the form of a knob is formed in the base 30 at its center. This protuberance 38 is centered in the inner bottom surface of the bowl and is adapted to interengage with a complementary portion on the bottom of the center post. For convenience in handling, handles 40 are also provided.

Figure 6:
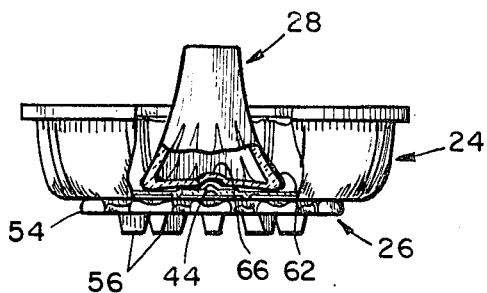
FIG. 6 is a side view, partially broken away, of a possible configuration using the serving dish, center post and trivet of the kit of the present invention.
Figure 5:
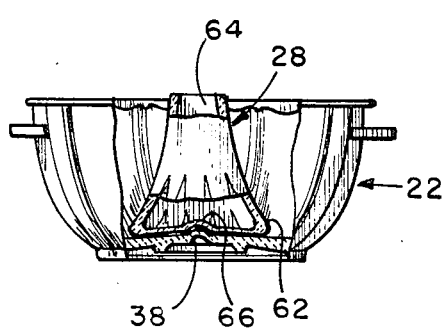
FIG. 5 is a side view, partially broken away, of one assembly of the parts of the cooking utensil kit. It shows the large bowl holding the complementary center post in interfitting relationship.

The post 28 of FIG. 2 comprises a wide base 62 and a narrow, open mouth 64. The post is generally in the shape of a truncated cone with a base outlined by a number of radial extensions 63 defining grooves 65 therebetween. As best shown in FIGS. 5 and 6, a concave indentation 66 is provided at the center of the base. The indentation has a lower diameter corresponding to the largest diameter of the protuberance 38 in the bowl 22 and depth of at least the height of the protuberance 38. By means of the complementary fit between the protuberance 38 on the bottom surface of the bowl and the indentation 66, the center post is adapted to be centered in the bowl to provide a cake pan. Due to the respective spherical concave and convex surfaces of the indentation 66 and the protuberance 38, when the post is moved near the center of the bowl to within the radius of the protuberance, the indentation easily slides down over the protuberance thereby centering the post.

Due to the conical shape of the post, it is very stable when centered in either the bowl or the dish. And because the post has a closed base and open mouth, it may be used separately as a container for syrup or the like. In this regard, it is significant that the indentation and not the protuberance is provided in the base surface of the post since the protuberance would interfere with the stability of the post in its separate use as a container.

In perparing a cake, the batter is first mixed in the bowl with the post removed. Then, the post is held at its top and is plunged into the batter. The closed base of the post easily separates the thin batter and, due to the spherical configuration of the protuberance 38 and the indentation 66, the post is quickly and easily centered in the bowl. The bowl, which was first used for mixing, is then placed with the batter and post into the microwave oven for baking, thereby reducing the number of utensils required.

Once a cake or the like has been baked in the bowl with the center post, the bowl may be inverted in accordance with the usual practice to deposit the cake from the bowl onto a platter. Because the center post sits loosely on the base surface of the bowl it does not interfere with movement of the cake from the bowl but remains centered in the cake. Subsequently, the post is removed axially from the cake. Due to its conical shape, contact between the post and cake is immediately broken as the post is pulled from the cake. This would not be the case with a cylindrical post which would tend to continue to grip the cake.

The serving dish 24, which may be used as a pie pan, comprises a base 42 which also has a protuberance 44 formed therein. Hence, the post is also adapted to be centered in the serving dish for baking a meat loaf or the like. Closed sides 46 surround the base and define a rim 48. Sides 46 are substantially the same size and shape as the rim 34 of the large bowl. That is, because the rim of the bowl in FIG. 1 is circular, the rim 48 is also circular and of about the same diameter.

Lip 50 is formed on rim 48. The inner diameter of lip 50 is slightly larger than the outer diameter of rim 34 on the bowl so that the rims of the bowl and serving dish are adapted for interfitting engagement. Accordingly, the serving dish may be used as such or as the lid to the bowl 22. Alternatively, the bowl may be used as a lid on the serving dish. The serving dish also includes handles 52.

Figure 7:
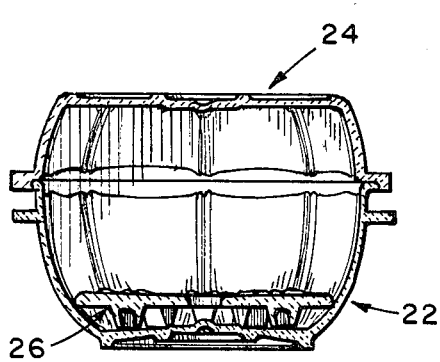
FIG. 7 is a cross-sectional view of a still further possible configuration, using the bowl, trivet, and inverted serving dish.
Figure 10:
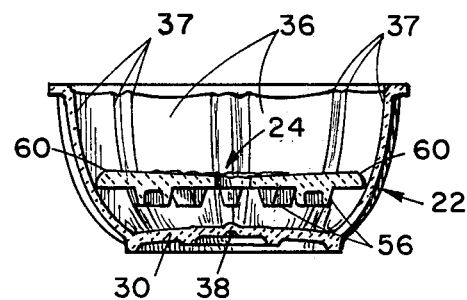
FIG. 10 is a cross-sectional view of another possible configuration wherein the trivet is in a raised position within the bowl.

The trivet of FIG. 4 comprises a plate 54 having a rim 58 of the same general shape as rims 34 and 48 on the bowl and serving dish respectively. Plate supporting extensions 56, better shown in FIG. 6, extend from one side of the plate. A floral design on the top surface of the plate provides radial extensions 60. When the trivet is placed inside the large bowl 22 on the base 30 as shown in FIG. 7, the extensions 60 engage complementary concave surface 36 thereby stabilizing the trivet within the bowl. If the trivet is slightly lifted from its position in FIG. 7 and rotated 22.5 degrees relative to the bowl the radial extensions 60 may be rested against the ridges 37. These ridges serve to raise the trivet to the position shown in FIG. 10 to provide a larger space between the trivet and the base 30 of the bowl for drippings and the like.

In the configurations shown in FIGS. 5 and 6, the center post 28 is placed in the large bowl 22 and the serving dish 24, respectively, to provide pans for preparing ring-shaped foods such as angel food cakes.

Figure 9:
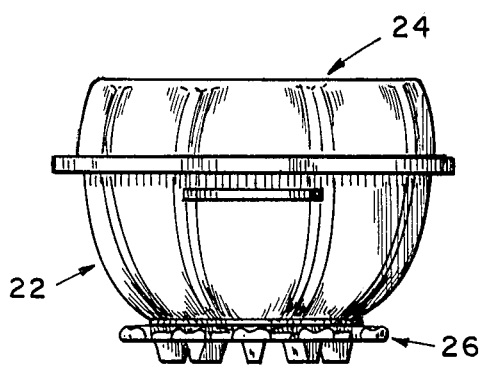
FIG. 9 is a side view of the bowl positioned on the trivet for baking in a microwave oven and covered by the serving dish.

It is known that the reflecting microwaves in the microwave oven do not provide a uniform wave pattern. There is, in effect, a hole in the wave pattern centrally of the lower portion of the oven. With the dish 24 positioned in the oven on the trivet 26, as shown in FIG. 6, the dish, and thus the food therein, is held substantially above this hole in the wave pattern. With the post in the bowl or dish and the latter positioned centrally in the oven, the food is also held away from the central region of the oven where the hole in the pattern is most likely. The trivet and post thus provide for more uniform cooking. As shown in FIG. 9, the bowl 22, with the dish 24 used as a cover, may also be positioned on the trivet for more uniform microwave cooking. With the pan configuration supported on the trivet 26, the trivet would also protect a heat sensitive surface from the hot serving dish. The trivet may and should be used in this manner for any configuration which does not require the trivet to be placed inside the bowl or dish.

Figure 8:
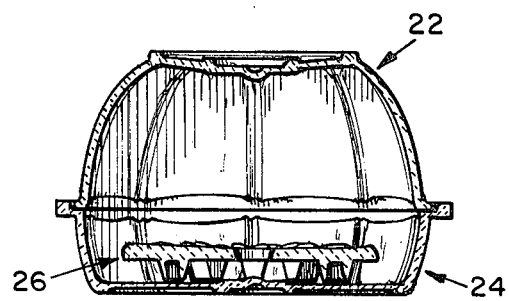
FIG. 8 is a cross-sectional view of yet another possible configuration wherein the bowl is inverted over the serving dish.

As shown in FIGS. 7 and 8, the trivet 26 may be placed inside either the bowl 22 or dish 24 to support a roast or the like. With the trivet thus positioned the food is held above the hole in the microwave pattern just as before and a space is further provided for drippings. The space may also be used for a liquid when steaming vegetables or the like.

In FIG. 7 the serving dish 24 serves as a cover for the bowl 22 and in FIG. 8 the bowl 22 serves as the cover. Alternatively, each utensil could be used separately without the cover.

Although only six cooking configurations have been shown, it is clear that many more are possible by simply rearranging the four components of the kit.

Figure 11:
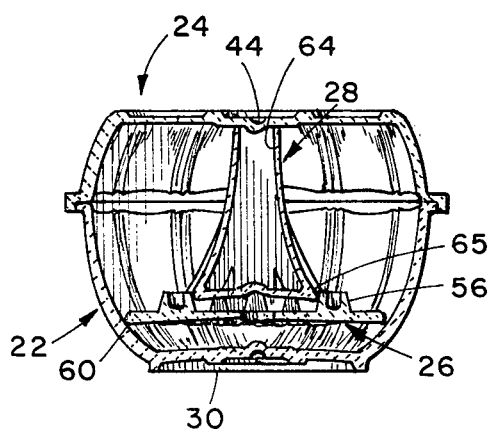
FIG. 11 is a cross-sectional view of the four components assembled for shipping and storage.

For storage or shipping the four components of the kit may be compactly stacked as shown in FIG. 11. The trivet is inverted and placed in the bowl with the radial extensions 60 engaging the complementary surfaces 36. The post is then placed centrally on the inverted trivet with radial extensions 63 from the post extending between the plate supporting extensions 56 of the trivet. In this manner, the grooves 65 rest against the supporting extensions 56 to hold the post in a raised position relative to the trivet plate 54. Finally the serving dish 24 is placed as a lid over the bowl. The components are dimensioned so that the protuberance 44 in the serving dish rests in the open mouth 64 of the post 28. With the serving dish placed over the bowl as shown, axial movement of the post and trivet within the bowl is prevented. And the radial extensions 63 from the post and the extensions 60 from the trivet prevent rotational movement of the two components within the bowl.

With the components arranged as shown in FIG. 11 they may be placed in a box with only a minimal amount of packing material for shipping. Alternatively a number of four-component kits may be stacked vertically without packaging for display.

In the home, the kit may be stored in the configuration shown in FIG. 11, thereby substantially reducing the amount of dust collecting on the food-contacting portions of the kit components. Or the bowl may be set upright in the upright serving dish with the trivet and cone placed in the bowl.

While the invention has been particularly shown and described with reference to a preferred embodiment thereof, it will be understood by those skilled in the art that various changes in form and details may be made therein without departing from the spirit and scope of the invention as defined by the appended claims:

I claim:

1. A cooking utensil kit having component parts capable of being assembled to form a pan of the type having a center post for preparing ring-shaped foods, each part being formed of a heat resistant material suitable for use in cooking in a home oven, said kit comprising:

a mixing bowl having a generally circular configuration and including sides and a closed base portion, the inner surface of said base portion having a generally hemispherical, centrally positioned protuberance of a predetermined size extending upwardly from said inner surface to a predetermined height, and a center post member adapted to be centrally positioned on the base surface of said mixing bowl, said center post member formed in the shape of a truncated cone having a height approximating that of said sides of said bowl and having its narrower diameter at the top thereof and its wider diameter at the bottom thereof, said narrow top diameter being sufficiently smaller than said wider bottom diameter of said post so that cooked food is easily removable from said post and said post is stable when positioned upright upon said protuberance during cooking, said center post member having a closed bottom surface adapted to receive said protuberance extending upwardly from said base surface of said bowl, said closed bottom surface including an indentation adapted for complementary fit with said protuberance, said indentation having a lower diameter corresponding to the largest diameter of said protuberance and a height at least as great as that of said protuberance, said inner surface of said base being substantially horizontal except in the area of said protuberance so that horizontal planar contact results between said bowl and the lower portion of said post to provide stability thereto, whereby said center post may be plunged into batter in said mixing bowl and be self-centered on the base surface of said bowl to form a pan for preparing ring-shaped foods.

2. The cooking utensil kit of claim 1 wherein the top of said post is open such that said post may serve as a container.

3. The cooking utensil kit of claim 1 further comprising a shallow serving dish adapted to receive and centrally position said center post, said shallow serving dish having a generally circular configuration and including sides and a base portion and the inner surface of said base portion having a generally hemispherical, centrally positioned protuberance of said predetermined size extending upwardly from said base surface of said serving dish, the sides of said serving dish being provided with means for providing an interfitting engagement with the sides of said mixing bowl, said serving dish thereby being adapted to serve as a lid to said bowl or to receive said bowl as a lid.

4. The cooking utensil kit of claim 3 wherein said means for providing an interfitting engagement between the sides of said dish and the sides of said mixing bowl comprises a lip formed on the rim of the sides of either said bowl or said serving dish, said lip being adapted to overlap the rim of the other of said bowl or serving dish.

5. The cooking utensil kit of claim 3 further comprising a trivet including a plate and a number of supporting extensions extending from one side of said plate, said trivet being adapted to be supported on the base of either the mixing bowl or the serving dish within the closed sides of either the bowl or serving dish.

6. The cooking utensil kit of claim 5 wherein said mixing bowl has an irregular inner surface and the trivet plate has an irregular outer rim complementary to the inner surface of the bowl.

7. The cooking utensil kit of claim 6 wherein said irregular inner surface of said mixing bowl includes a number of concave portions bordered by pairs of inwardly protruding ridges and said outer rim of said trivet plate has radial extensions complementary to said concave portions, whereby said trivet may be elevated by rotating it relative to said bowl such that said radial extensions of said trivet plate rest against said ridges and not against said concave portions.

8. The cooking utensil kit of claim 6 wherein the base of said center post member is outlined by a number of radial extensions equal in number to said supporting extensions from said trivet plate, said center post being adapted to be positioned centrally on said trivet with said trivet inverted, said radial extensions from said post extending between said supporting extensions, thereby preventing rotation of said post relative to said trivet.

9. A cooking utensil kit having component parts capable of being assembled into a number of configurations for preparing or serving food, each part being formed of a heat resistant material suitable for use in cooking in a home oven, the kit comprising the combination of:

a mixing bowl having a generally circular configuration and including sides and a closed base portion, the inner surface of said base portion having a generally hemispherical, centrally positioned protuberance of a predetermined size extending upwardly from said inner surface to a predetermined height;

a shallow serving dish having a generally circular configuration and including sides and a base portion, the inner surface of said base portion having a generally hemispherical, centrally positioned protuberance of said predetermined size extending upwardly from said base surface of said serving dish, the sides of said serving dish being provided with means for providing an interfitting engagement with the sides of said bowl, said serving dish thereby being adapted to serve as a lid to said bowl or to receive said bowl as a lid;

a center post member adapted to be centrally positioned on the base surface of either said bowl or said shallow serving dish, said center post member being formed in the shape of a truncated cone having a height approximating that of said sides of said bowl and having its narrower diameter at the top thereof, said center post member having a bottom surface adapted to receive either of said protuberances extending upwardly from said base surfaces of said bowl and said shallow serving dish, said bottom surface including an indentation adapted for complementary fit with either of said protuberances, said indentation having a lower diameter corresponding to the largest diameter of said protuberances and a height at least as great as that of said protuberances, whereby said center post may be centered on the base surface of either said bowl or said shallow serving dish to form a pan for preparing ring-shaped foods; and a trivet including a plate and a number of supporting extensions extending from one side of said plate, said trivet being adapted to be supported on the base of either the bowl or the serving dish within the closed sides of either the bowl or the serving dish.

10. The cooking utensil kit of claim 9 wherein the bottom surface of said post is closed and the top of said post is open such that said post may serve as a container.

11. The cooking utensil kit of claim 9 wherein said means for providing an interfitting engagement between the sides of said dish and the sides of said bowl comprises a lip formed on the rim of the sides of either said bowl or said serving dish, said lip being adapted to overlap the rim of the other of said bowl or serving dish.

12. The cooking utensil kit of claim 9 wherein said bowl has an irregular inner surface and the trivet plate has an irregular outer rim complementary to the inner surface of the bowl.

13. The cooking utensil kit of claim 12 wherein said irregular inner surface of said mixing bowl includes a number of concave portions bordered by pairs of inwardly protruding ridges and said outer rim of said trivet plate has radial extensions complementary to said concave portions, whereby said trivet may be elevated by rotating it relative to said bowl such that said radial extensions of said trivet plate rest against said ridges and not against said concave portions.

14. The cooking utensil kit of claim 12 wherein the base of said center post member is outlined by a number of radial extensions equal in number to said supporting extensions from said trivet plate, said center post being adapted to be positioned centrally on said trivet with said trivet inverted, said radial extensions from said post extending between said supporting extensions, thereby preventing rotation of said post relative to said trivet.

15. A cooking utensil kit having component parts capable of being assembled to form a pan of the type having a center post for preparing ring-shaped foods, each part being formed of a heat resistant material suitable for use in cooking in a home oven, said kit comprising:
a mixing bowl having a generally circular configuration and including sides and a closed base portion, the inner surface of said base portion having a generally hemispherical, centrally positioned protuberance of a predetermined size extending upwardly from said inner surface to a predetermined height, and
a center post member adapted to be centrally positioned on the base surface of said mixing bowl, said center post member having a height approximating that of said sides of said bowl, said post having a closed bottom surface such that it may serve as a container,
said closed bottom surface being adapted to receive said protuberance extending upwardly from said base surface of said bowl, said closed bottom surface defining an indentation adapted for complementary fit with said protuberance, said indentation having a lower diameter corresponding to the largest diameter of said protuberance and a height at least as great as that of said protuberance,
whereby said center post may be plunged into batter in said mixing bowl and be centered on the base surface of said bowl to form a pan for preparing ring-shaped foods.

16. The cooking utensil kit as claimed in claim 15 wherein said center post member is formed in the shape of a truncated cone.

17. A cooking utensil kit having component parts capable of being assembled to form a pan of the type having a center post for preparing ring-shaped foods, each part being formed of a heat resistant material suitable for use in cooking in a home oven, said kit comprising:
a mixing bowl having a generally circular configuration and including sides and a closed base portion, the inner surface of said base portion having a generally hemispherical, centrally positioned protuberance of a predetermined size extending upwardly from said inner surface to a predetermined height, and
a center post member adapted to be centrally positioned on the base surface of said mixing bowl, said center post member formed in the shape of a truncated cone having a height approximating that of said sides of said bowl and having its narrower diameter at the top thereof, said post having a closed bottom surface such that it may serve as a container,
said closed bottom surface being adapted to receive said protuberance extending upwardly from said base surface of said bowl, said closed bottom surface defining an indentation adapted for complementary fit with said protuberance, said indentation having a lower diameter corresponding to the largest diameter of said protuberance and a height at least as great as that of said protuberance,
whereby said center post may be plunged into batter in said mixing bowl and be self-centered on the base surface of said bowl to form a pan for preparing ring-shaped foods.

18. The cooking utensil kit of claim 17 further comprising a shallow serving dish adapted to receive and centrally position said center post, said shallow serving dish having a generally hemispherical, centrally positioned protuberance of said predetermined size extending upwardly from said base surface of said serving dish,
the sides of said serving dish being provided with means for providing an interfitting engagement with the sides of said mixing bowl, said serving dish thereby being adapted to serve as a lid to said bowl or to receive said bowl as a lid.

19. The cooking utensil kit of claim 18 wherein said means for providing an interfitting engagement between the sides of said dish and the sides of said mixing bowl comprises a lip formed on the rim of the sides of either said bowl or said serving dish, said lip being adapted to overlap the rim of the other of said bowl or serving dish.

20. The cooking utensil kit of claim 18 further comprising a trivet including a plate and a number of supporting extensions extending from one side of said plate, said trivet being adapted to be supported on the base of either the mixing bowl or the serving dish within the closed sides of either the bowl or serving dish.

21. The cooking utensil kit of claim 20 wherein said mixing bowl has an irregular inner surface and the trivet plate has an irregular outer rim complementary to the inner surface of the bowl.

22. The cooking utensil kit of claim 21 wherein said irregular inner surface of said mixing bowl includes a number of concave portions bordered by pairs of inwardly protruding ridges and said outer rim of said trivet plate has radial extensions complementary to said concave portions, whereby said trivet may be elevated by rotating it relative to said bowl such that said radial extensions of said trivet plate rest against said ridges and not against said concave portions.

23. The cooking utensil kit of claim 21 wherein the base of said center post member is outlined by a number of radial extensions equal in number to said supporting extensions from said trivet plate, said center post being adapted to be positioned centrally on said trivet with said trivet inverted, said radial extensions from said post extending between said supporting extensions, thereby preventing rotation of said post relative to said trivet.

* * * * *